(12) United States Patent
Hsu (10) Patent No.: US 9,410,527 B2
(45) Date of Patent: Aug. 9, 2016

(54) TUNABLE APPARATUS FOR GENERATING ENERGY FROM A FLUID FLOW INDUCED MOVEMENT OF A SURFACE STRUCTURE RELATIVE TO A FRAME WITH AT LEAST ONE ADJUSTABLE FRAME PORTION

(71) Applicant: Sean Nean Hsu, Plano, TX (US)

(72) Inventor: Sean Nean Hsu, Plano, TX (US)

(73) Assignee: Sean N. Hsu

( * ) Notice: Subject to any disclaimer, the term of this patent is extended or adjusted under 35 U.S.C. 154(b) by 0 days.

(21) Appl. No.: 13/842,366

(22) Filed: Mar. 15, 2013

(65) Prior Publication Data

US 2013/0214532 A1     Aug. 22, 2013

Related U.S. Application Data

(63) Continuation-in-part of application No. 13/551,593, filed on Jul. 17, 2012.

(60) Provisional application No. 61/508,694, filed on Jul. 18, 2011.

(51) Int. Cl.
*F03G 7/08* (2006.01)
*F03B 17/06* (2006.01)

(52) U.S. Cl.
CPC . *F03B 17/06* (2013.01); *F03G 7/08* (2013.01); *Y02E 10/28* (2013.01)

(58) Field of Classification Search
CPC ............ F03B 17/06; F03D 5/00; F03D 9/00; H02K 35/02; H02K 7/1892; Y02E 10/28; Y02E 10/70; Y02E 10/72
See application file for complete search history.

(56) References Cited

U.S. PATENT DOCUMENTS

| | | | | |
|---|---|---|---|---|
| 4,348,594 A * | 9/1982 | Lipfert | ............................ | 290/54 |
| 6,081,043 A * | 6/2000 | Robles Akesolo | .............. | 290/55 |
| 6,700,217 B1 * | 3/2004 | North et al. | ..................... | 290/53 |
| 7,581,926 B1 * | 9/2009 | Dehlsen et al. | ................. | 416/87 |
| 7,626,281 B2 * | 12/2009 | Kawai | .............................. | 290/54 |
| 8,222,754 B1 * | 7/2012 | Soliman et al. | ............... | 290/1 R |
| 8,604,631 B2 * | 12/2013 | Rohrer | .......................... | 290/42 |
| 8,610,304 B2 * | 12/2013 | Filardo | .......................... | 290/54 |
| 2008/0128560 A1 * | 6/2008 | Hyde et al. | ..................... | 244/203 |
| 2009/0079200 A1 * | 3/2009 | Gieras et al. | ..................... | 290/1 R |
| 2009/0218824 A1 * | 9/2009 | Freeland et al. | .............. | 290/1 R |
| 2010/0102565 A1 * | 4/2010 | Gartner | .......................... | 290/54 |
| 2010/0308590 A1 * | 12/2010 | Rohrer | .......................... | 290/53 |
| 2012/0119507 A1 * | 5/2012 | Tuttle | ................................ | 290/55 |
| 2013/0341936 A1 * | 12/2013 | Wood et al. | ................... | 290/1 R |
| 2014/0023481 A1 * | 1/2014 | Drevet | .......................... | 415/90 |
| 2014/0132003 A1 * | 5/2014 | Hayashi et al. | ................ | 290/53 |
| 2014/0152025 A1 * | 6/2014 | Renga et al. | ................... | 290/1 R |

* cited by examiner

Primary Examiner — Tulsidas C Patel
Assistant Examiner — S. Mikailoff
(74) Attorney, Agent, or Firm — Dustin R. Lo (57) ABSTRACT

A tunable generator has a surface structure for contacting an exterior fluid flow relative to a base structure. The contacting surface structure also has an electrogenerative portion positioned relative to the contacting structure and the base structure. The electrogenerative portion is preferably a piezoelectric or electromagnetic structure, although other types of structures are known within the art. The contacting surface is mechanically coupled to portions of the base structure through one or more elastic elements. The various portions of the base structure can be positioned relative to other base structure portions to alter the elasticity of the system or the tensioning of the elastic elements. The field of flow exerts forces upon the contacting structure which causes movement in the contacting surface structure relative to the base structure through the electrogenerative portion.

4 Claims, 11 Drawing Sheets

TUNABLE APPARATUS FOR GENERATING ENERGY FROM A FLUID FLOW INDUCED MOVEMENT OF A SURFACE STRUCTURE RELATIVE TO A FRAME WITH AT LEAST ONE ADJUSTABLE FRAME PORTION

CROSS-REFERENCE TO RELATED APPLICATIONS

This application is a continuation-in-part from U.S. non-provisional patent application Ser. No. 13/551,593, filed Jul. 17, 2012, which claims priority to U.S. provisional patent application Ser. No. 61/508,694, filed Jul. 18, 2011.

BACKGROUND

1. Field of the Invention

The preferred embodiments of the invention are directed to the field of power generation.

2. Description of the Related Art

Generators harnessing energy from a fluid flow (such as air) are known within the art, however such generators typically have turbines or propellers which have a large cross-section. The movement of the medium creates a motive force upon the turbine or propeller, which is connected to a device to convert the movement into electricity. But the large cross-sections of these traditional designs increase the amount of wind resistance presented by the generators, limiting the practicality of their application in certain fields.

For example, the prior art describes a vehicle having a wind tunnel and turbine generator, but the aerodynamic limitations of the turbine are not ideal for vehicular applications. Those disclosures created wind resistances which would substantially decrease fuel efficiency. The energy would also be capped at a theoretical 60% recovery, further impacting the efficiency relative to the burden on the system from the design. Other generator designs have been developed to try to minimize the aerodynamic cost of the generators. For example, designs have sought to take advantage of the aeroelastic or flutter effect in aerodynamics by placing structures into the middle of a fluid flow. These designs have previously suggested using wings that move about one or two points or elastic membranes that are fixed at two ends. These designs cross the fluid flow, creating oscillations perpendicular to the fluid flow in the wing or membrane. The designs introduce drag and a blocking obstacle in the fluid flow and require supporting structures which greatly affect the cross-sectional aerodynamics. They also require a fixed direction of fluid flow that is perpendicular to the orientation of the long axis of the wing or membrane. The prior art describes one such design utilizing a string membrane pulled taut across two rigid structures. Similarly, the prior art describes wing generators have been presented which mount a wing across two support pillars to generate electricity from the pitch and yaw motion of the wing.

Kite generators have also been presented which transfer kite movement to a fixed base structure through a tether. These kites are typically flown at higher altitudes to harness the stronger wind forces. Similarly, there is currently interest in developing tethered autonomous flight vehicles with generators that are flown at high altitude to take advantage of the greater wind forces at altitude.

Prior devices typically required large structures and/or large motive forces, which often mean that the devices could only be operated under certain conditions or in certain locations. These devices also typically have many moving parts, which increase the need for maintenance and the potential for breakdown. These devices also face increased stresses as motive forces increased, requiring designs or use that compensated for high speed or shut down to avoid damage. Furthermore, the output from these devices varies substantially with the relative velocity of the medium, often requiring the design to compensate for velocities outside of a tolerance range.

These devices also often times require a fixed direction of flow. In order to compensate for varying directions of flow, previous devices have been rotatable with guiding panels to orient the device in the correct direction relative to the direction of flow.

Each of these designs presents its own complications and complexities, at least some of which can be alleviated by an embodiment of the present invention. For example, the aerodynamic cost from the cross-sectional shapes of many of these designs is too high for certain applications, such as in vehicular applications. Additionally, the mechanical complexities of some of the devices have been a noted concern, resulting in high cost, difficult maintenance, and overall complicated manufacturing. Other designs are unidirectional and not able to be accommodating of changing directions of fluid flow without additional rotational structures. Some of the designs are also dependent on the speed of fluid flow, with limited efficiency or effectiveness outside of a narrower range of preferred flow speeds. Some designs may even break down at excessive speeds, as has been shown in test flights of generators at altitude.

There is a need for a device that can generate electricity from relatively lower levels of motive force and provide smaller cross-sections. There is also a need for scalable, stackable devices to generate electricity in locations where traditional devices are not suitable. The increased use of electric and hybrid engine systems in vehicles has also created an increased need for ways of generating electricity to recharge batteries.

Also, given a stated desire to design turbine generators that operate at altitude under strong winds and via cables or tall supporting structures, there is a need for a device which minimizes aerodynamic complications associated with turbines and other non-aerodynamic shapes so as to more easily maintain operational altitude and minimize complications from stronger wind speeds.

SUMMARY OF THE INVENTION

It is therefore an object of an embodiment of the present invention to provide a generator that utilizes relative movements of a particular medium to generate electricity. The generator harnesses the energy of surface structure movements influenced at least by forces due to the flow of fluid of the medium. The energy is converted to electricity via an electrogenerative portion.

It is also an object of an embodiment of the present invention to provide a generator that operates more independently of the direction of movement of a particular medium. It is also an object of an embodiment of the present invention to provide a generator that is less susceptible to large motive forces and more structurally robust under such extreme circumstances. It is another object of an embodiment of the present invention to provide a generator design more capable of accommodating a number of varied flow speeds. It is another object of an embodiment of the present invention to provide a generator design that is reduced is size, complexity, and cost.

It is also an object of an embodiment of the present invention to provide a generator with a small form-factor. It is also an object of an embodiment of the present invention to provide an electric generator that utilizes wind power with a relatively limited cross-section. It is also an object of an embodiment of the present invention to provide an electric generator that does not significantly increase drag or alter the aerodynamics and/or wind resistance of the base structure. It is also an object of an embodiment of the present invention to provide a generator which is modular, stackable in series and/or parallel, and scalable, providing multiples of combinations depending on available space and power requirements.

It is another object of an embodiment of the present invention to provide a generator design that can be incorporated with a number of varied applications, including for example, vehicular movement such as automobiles, rail, marine, and aviation.

It is another object of an embodiment of the present invention to provide a tunable fluid flow generator system which can be adjusted or tuned according to any number of variables, including system performance, device status, sensor values and environment measurements and corresponding method for adjusting a fluid flow generator. Such a system and method permits more efficient harnessing of the available energy by modifying the operational characteristics of the fluid flow generator to more closely approximate the ideal system characteristics for a given set of measured variables. One such characteristic that can be modified by an embodiment of the present invention would be the overall elasticity of the fluid flow generator. Another such characteristic that can be modified by an embodiment of the present invention would be the tensioning of certain elastic members in the fluid flow generator.

It is another object of an embodiment of the present invention to provide a microcontroller for automatically adjusting the fluid flow generator based on one or more input values to control the operation of servos in the fluid flow generator.

It is another object of an embodiment of the present invention to provide a braking mechanism and method for a fluid flow generator by allowing the system operation to be damped or restricted so as to reduce or prevent movement of the contacting portion of the fluid flow generator.

BRIEF DESCRIPTION OF DRAWINGS

In the drawings, wherein like reference numerals denote similar elements throughout the figures.

DETAILED DESCRIPTION OF THE PREFERRED EMBODIMENTS

Some embodiments of the invention are described below in further detail with respect to the Figures.

According to an aspect of an embodiment of the invention, a generator has a surface structure or contacting portion relative to a base structure or frame and is positionable within a field of flow. Preferably, the surface structure is connected to the base structure along the leading edge of the surface structure relative to the direction of flow such that the field of flow is directed substantially over the surface structure. The surface structure can be shaped in a number of ways when taking into account aerodynamics, including curvilinear, faceted, and angular shapes. Many structural shapes are known within the art and can be incorporated here to provide a desired level of aerodynamics for the particular application, such as aerofoils, wing shapes, spoilers, riblets, curved leading edges, etc. The surface structure design also helps to generate a motive force from the field of flow, depending on the orientation of the surface structure and/or the angle of the surface structure relative to the field of flow.

In another aspect of an embodiment of the invention, the generator has an electrogenerative portion or energy converting portion positioned relative to the surface structure and the base structure. The electrogenerative portion is preferably a piezoelectric or an electromagnetic structure, although other types of structures are known within the art. The field of flow exerts forces upon the surface structure which causes surface structure movement relative to the base structure and generates electricity through the electrogenerative portion. The electricity generated can be directed to one or more systems requiring electrical input. The electricity generated can also be directed to a charging circuit for a storage device (such as a battery or capacitor) for later use. Circuits for rectifying, multiplying and otherwise modifying the energy output of the generator can also be employed to match the requirements of the electrical load(s).

In another aspect of an embodiment of the invention, the system can be designed so as to present counteracting forces from a biasing member apart from the forces from the field of flow. For example, springs or elastics can be used to add forces present when the system is outside a field of flow. If the generator is designed to have an enclosed area from the field of flow, then the relative pressure differential from the field of flow and within the enclosed area will also contribute additional forces. If the generator is designed to have a pairing of surface structures where movement of one surface structure induces movement in the other surface structure, then the movement forces of the first surface structure can be viewed also as an additional force for the second surface structure. Depending on the orientation of the surface structure, gravity may also contribute an additional force on the system. And depending on the position of the surface structure in the field of flow, these additional forces will aide and/or oppose the forces from the field of flow.

The forces present on the surface structure act like an impulse or input force on the generator, which can be viewed as an oscillating spring system. Continued flow contributes energy to the oscillating spring system, generating a prolonged oscillation pattern as the system seeks to return to equilibrium. By design, the generator system can preferably be built to have damping characteristics that are modeled as critically damped or even underdamped, resulting in oscillations that do not decay so long as the system continues to have input energy. The oscillating motion directs the motive energy in the surface structure to the electrogenerative portion which converts it to electrical energy.

Figure 1A:
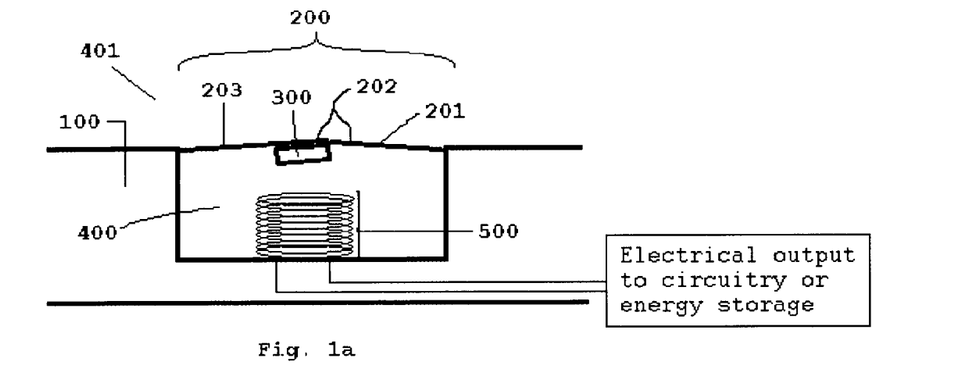
FIG. 1a depicts an example of a cell for implementing an embodiment of the present invention with a coil in which a magnet is only secured on one end.
Figure 1B:
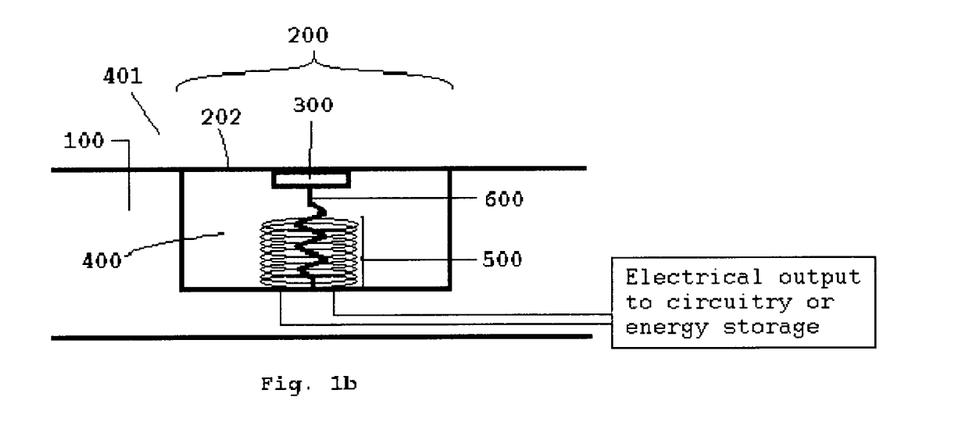
FIG. 1b depicts another example of a cell for implementing an embodiment of the present invention with a coil in which a magnet is secured on two ends.
Figure 1C:
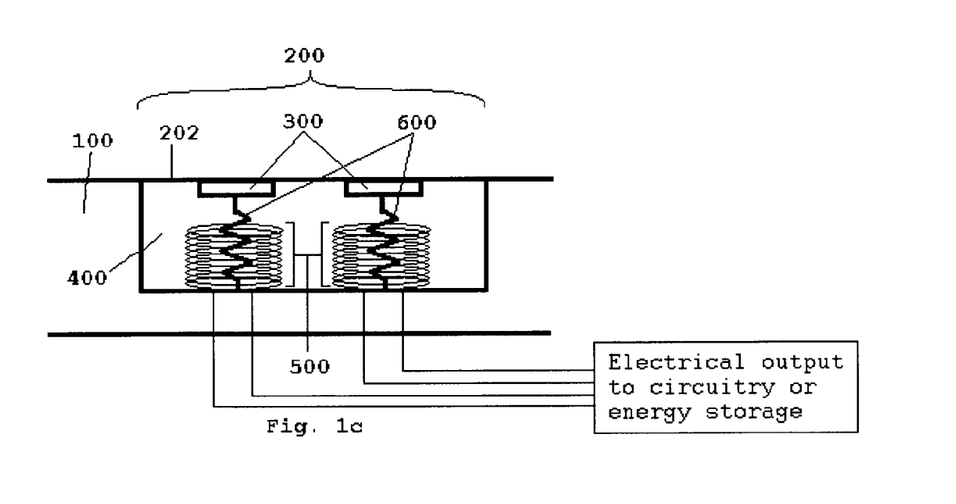
FIG. 1c depicts another example of a cell for implementing an embodiment of the present invention in which two coils are located within the same cavity.

Referring to FIGS. 1a, 1b, and 1c a generator cell 200 has a covering 202 over a cavity 400 having an initial pressure. This initial pressure is preferably at or around the pressure of the surrounding medium when the surrounding medium is static. Cavity 400 is preferably sealed to be airtight or watertight. In such arrangements, cavity 400 can be pressurized to bias the initial force on covering 202. When the surrounding medium is moving relative to the enclosed medium within the cavity, a pressure difference is created across the covering 202. This pressure difference will exert force upon covering 202 as the medium attempts to equilibrate the difference. The elasticity of the overall system creates oscillations from this change to the steady state pressures. System elasticity can be achieved from at least the following sources: the cover, a spring, the internal medium, the connective portion between the substrate and the cover.

In other embodiments, cavity 400 can be partially enclosed but not sealed. For example, cavity 400 may have one or more additional uncovered openings in the enclosure so long as the pressure in cavity 400 is relatively different than that resulting from movement in the medium on the outside of the cover 202. For example, this relationship can be maintained by having a long separation between the medium immediately on either sides of covering 202 where the separation extends in the direction of the flow of the surrounding medium. In another embodiment of the present invention, cavity 400 could have an opening to the enclosure facing the direction of flow of the medium where the enclosure is shaped to alter the pressure inside the enclosure and under covering 202 relative to the surrounding medium outside covering 202. For example, the enclosure could be shaped to have a relatively large opening that tapers to a smaller opening or vis a versa. Each enclosure shape would alter the pressure within cavity 400 and under covering 202, relative to the surrounding medium. In a preferred embodiment of the present invention, cavity 400 would have an enclosure that does not have an opening facing the direction of flow of the medium.

Covering 202 is preferably flexible or elastic and made of materials that are expandable in surface area. The pressure difference across covering 202 that results from relative movement of the surrounding medium would create a force on covering 202 and induce movement. The combination of elastic forces in the covering, reactionary forces from pressure changes under covering 202, applied forces from the surrounding medium onto changes in the shape of covering 202, and/or any additional spring devices in the embodiments as described below, create counter-movement. The combination of forces can be tuned and balanced so as to generate resonance in the covering 202.

An example material for covering 202 could be rubber. Covering 202 could also comprise multiple parts, optionally made of different materials or having different characteristics such as different rigidity, weight, or thickness. For example, in FIG. 1a, covering 202 is shown having two parts 203 and part 201. Part 203 can be made of a relatively rigid material to which magnet 300 is mounted. For example, a styrofoam material preferably can be used as the rigid structure 203, providing light weight but rigid material. Plastics could also be used to form structure 203. Part 201 can be made of a relatively flexible material, preferably extending from Part 203 to cover the uncovered remainder of cavity 400. In a preferred embodiment of the present invention, the covering 202 has a relatively rigid part 203 with riblets to reduce drag. The relatively rigid part 203 can be angled in the neutral state of the cell such that downwards pressure is generated at the onset from the moving medium. In a preferred embodiment, the riblets can be spaced at around twice the height of the riblets in order to further decrease drag. Alternatively, the spacing of the riblets and their height can be designed so as to create a cross-section in the surface that optimizes the reduction in drag. Various shapes of riblets, along with their size and spacings have been studied within the art for years.

In another embodiment of the present invention, the covering 202 has riblets spaced along a relatively flexible surface. The riblets can be relatively rigid by comparison, a characteristic that can be achieved for example by having a certain thickness to the riblet which relatively reduces stretching or forming the riblets out of a different material. As the covering 202 expands, the spacing between the riblets changes. In a preferred embodiment, at about an expected pressure differential between the interior of the cell and the outside medium which is moving relatively at an expected speed, the riblets will be spaced at a distance different from the neutral state because the covering has expanded or stretched. The particular spacing can be designed in accordance to the height of the riblet to be twice the riblet height, or alternatively to take into consideration the cross-sections formed by the spacing and the riblet height. Preferably, this increased spacing will decrease relatively the amount of drag of the covering as a result of the bulging of the cover. The height of the riblets preferably remains substantially the same throughout the stretching range of the covering 202, although the riblets can be designed to also flatten out during stretching if the design parameters contemplate it.

Figure 1D:
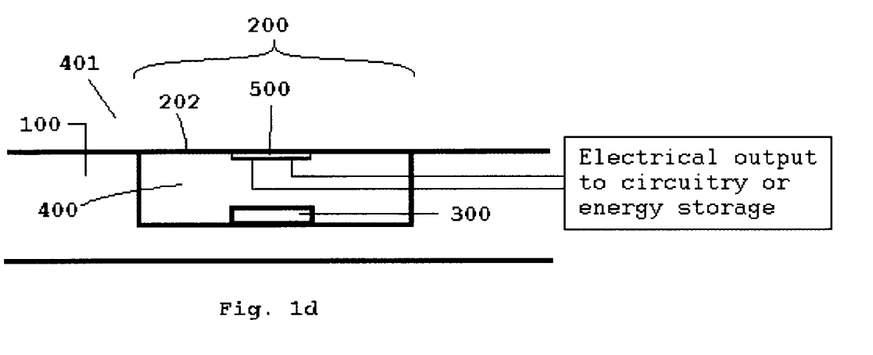
FIG. 1d depicts another example of a cell for implementing an embodiment of the present invention with a coil in which a magnet is positioned so that the coil is on the cover instead of the substrate.
Figure 1E:
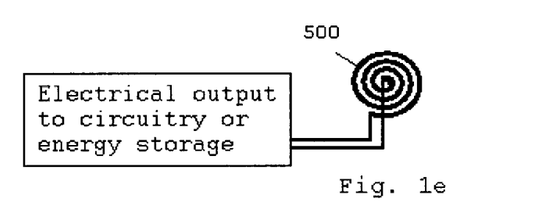
FIG. 1e depicts an example of a coil placed on the cover.
Figure 1F:
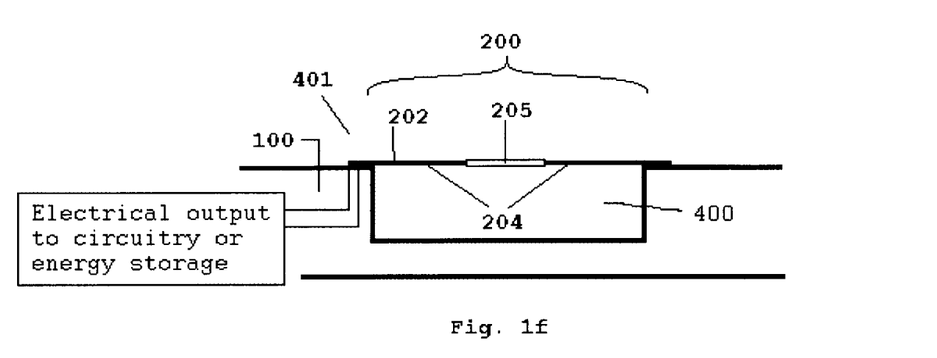
FIG. 1f depicts another example of a cell for implementing an embodiment of the present invention with a film material in or on the cover made of piezoelectric materials.
Figure 1G:
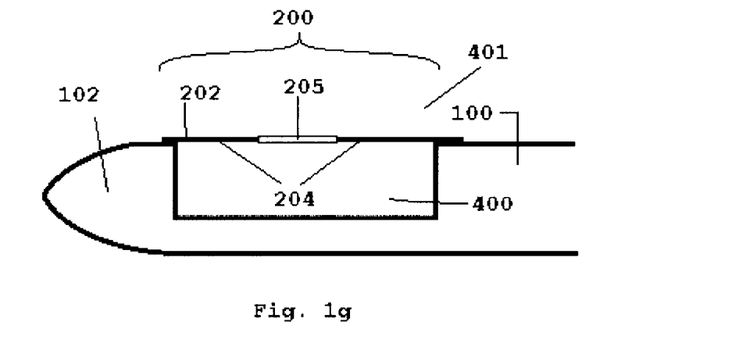
FIG. 1g depicts the cross section of a wing structure for implementing an embodiment of the present invention with a leading edge and a flexible surface.
Figure 1H:
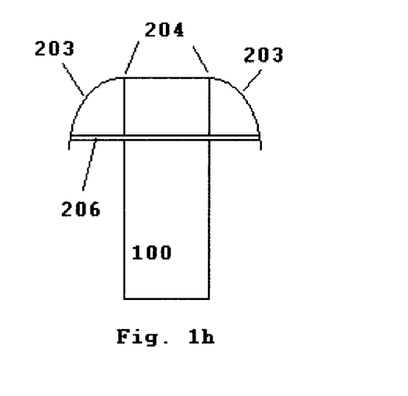
FIG. 1h depicts a coupled structure where the two paired surface structures are placed and joined opposite one another by a connecting rod.
Figure 1I:
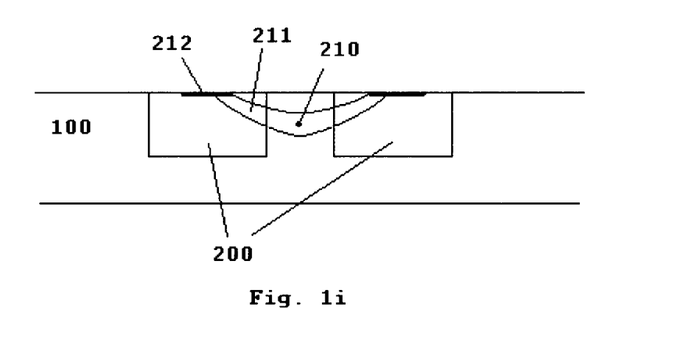
FIG. 1i depicts a coupled structure where the two paired surface structures are placed and joined adjacent one another.
Figure 1J:
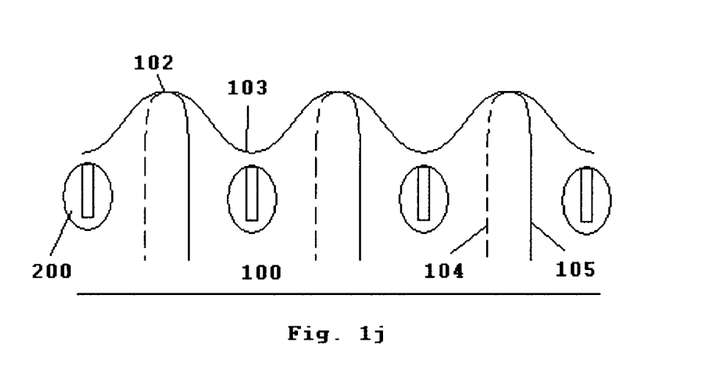
FIG. 1j depicts placement of cells on a base structure having oscillating protrusions on the leading edge.
Figure 1K:
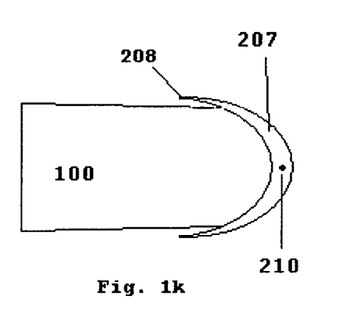
FIG. 1k depicts a coupled structure where the curved surface structure is rigid so as to join the two opposite curved surfaces around the pivot point.

In another embodiment, as shown in FIG. 1*j*, the cells 200 are positioned along a surface 100 at intervals corresponding to the peaks 102 or valleys 103 of an oscillating edge shape. The benefits of such an oscillating edge shape are disclosed in U.S. Pat. No. 6,431,498. The oscillating edge shape provides leading protrusions 102 which act to separate fluid flow into streams along the direction of the valleys, reducing drag. Preferably, the cells 200 are aligned along the valleys 103 to take advantage of the separated fluid streams. In another preferred embodiment, the cells 200 can be positioned after the leading edge but still within the physical valleys 103. In another embodiment, the cells can be incorporated into the protrusions 102 themselves, such as a design where the surface structure is positioned in a c-shape across the top 105 and bottom 104 of the leading edge with a pivot around the leading point of the protrusion 102. A similar cross-sectional view of one such protrusion can be seen in FIG. 1*k* where, in one embodiment, the protrusion comprises a curved structure 207 pivoting along the outermost point 210. In a fluid flow, the curved surface structure 207 oscillates along the pivot point 210 to alternately increase and decrease the relative height of the protruding structure along the length of the protrusions in FIG. 1*j*, 104 and 105. The curved structure 207 can also be connected to the base structure 100 via a flexible cover extending from the end point of the curved structure 208 to a location along the base structure surface 100.

In FIGS. 1*a*, 1*b*, 1*c* and 1*d*, movements in magnet 300 provide a changing magnetic field to a coil 500, inducing an electric current. First, when the surrounding medium 401 has a pressure difference relative to the initial pressure in the cavity, the covering 202 flexes to try to equalize the pressure difference. The equalization may also overshoot, causing a differential in the other direction. Second, in some embodiments when the surrounding medium 401 changes pressure due to relative movement, the velocity also provides a force on the covering 202 when part of the covering 202 flexes into the surrounding medium. This force will in turn relatively increase the pressure within the cavity 400. In other embodiments, the covering 202 may not flex above the surface of the substrate 100, so the movement would be attributable to the relative changes in pressure both outside and inside the cavity 400. Additionally, the material used in covering 202 may provide elasticity which would provide forces to return the magnet 300 to the initial position. In FIG. 1*b*, a spring 600 (or other elastic retaining mechanism) can also be attached between the magnet and the coil 500 or the structure 100. This spring 600 provides additional force on the magnet 300, and can be designed so that the magnet 300 is pushed out, pulled in, or neutrally positioned in the initial state of the generator cell 200. Other connective devices other than springs 600 can be used to provide tension or recoil, such as an elastic structure.

Cell 200 can be designed to include multiple magnets 300 and coils 500 within the same cavity 400. Such an arrangement would function similarly to FIGS. 1*a* and 1*b*, but provide added output for the same displacement forces. One such possible arrangement is depicted in FIG. 1*c*, showing two magnets 300 and two coils 500 within the same cavity 400. The magnets 300 also have two springs 600 connecting them to the structure 100. In another embodiment, FIG. 1*c* can be implemented with only one magnet 300 on cover 202. Two or more coils 500 are grouped with the magnet 300 such that movement by the single magnet 300 generates electricity in the plurality of the coils 500. Preferably, the single magnet 300 is sufficiently large in size so as to cover the combined cross-section of the group of coils 500.

Coil 500 can be wound in a number of different ways which are well known, such as a bifilar coil, a Barker coil, a flat coil, a planar spiral coil, a Helmholtz coil, a Maxwell coil, or a Tesla coil. One such example is provided in FIG. 1*e*. The magnet 300 is moved relative to the coil 500 by a number of factors. The coil 500 and the magnet 300 can also be interchangeably positioned, as shown in FIG. 1*d* where the coils are fixed to the cover 202 as opposed to the substrate 100. In another embodiment of the present invention, multiple coils 500 can be fixed to the same cover 202. Coil 500 in FIGS. 1*a*-1*d* can also be designed so as to decrease the vertical space required for cell 200, such as with a flat coil or a planar spiral coil. Various coil designs will provide different tradeoffs between the amount of power generated, manufacturing cost, and coil size, and the particular selections will depend on the requirements of the application or preferences of the designer. In another embodiment of the present invention, a plurality of coils 500 is arranged within each cell 200 where the plurality of coils 500 contains two or more different coil designs. Preferably, the different coil designs are chosen to complement one another.

In FIG. 1*f*, covering 202 is shown having at least two parts 204 and 205 where part 204 contains a piezoelectric material or film and part 205 does not. In another preferred embodiment, parts 204 straddle the edge of cell 200 so that movement in covering 202 results in a bending of parts 204, along with the piezoelectric material. In an alternative embodiment, the piezoelectric material or film could be throughout covering 202 such that covering 202 consists of only one part. In an alternative embodiment, the piezoelectric material or film could be layered on top of a part 204 of covering 202 or the entirety of covering 202. In addition to piezoelectric materials, generators using nanowires as known in the state of the art can also be used to generate electricity when the nanowires are flexed. Another alternative embodiment utilizes a piezoelectric skin as known in the state of the art which has a particularly optimized design to efficiently generate electricity from vibrations. It will be obvious to persons of ordinary skill in the art to use similar types of electrogenerative films in place of a piezoelectric material. Movement in covering 202 would directly result in bending of the piezoelectric material 204 or film in covering 202.

By spacing the generator cells at particular intervals and designing them to have a particular depth or departure from the smooth surface state, drag can even be reduced by the alternating structure resulting from movement. Alternatively, the neutral state of the coverings for each cell can be designed such that they sag inward. By spacing the cells, a dimple effect like with a golf ball can be created. Dimple effects are well known to persons of ordinary skill in the art.

In another embodiment, multiple surface structures can be grouped together so that a force on one structure results in forces on the other structures. In FIG. 1h, this is depicted where the surface structures 203 are paired with another surface structure 233 opposite the overall shape of the generator housing or substrate 100. Similarly in FIG. 1k, the two halves of a curved surface structure 207 are positioned opposite each other relative to a field of flow. The pairing can be accomplished through rigidity in the material joining the two surface structures 207 along a pivot point or pivot axis 210, or can be accomplished through a physical connector such as a rod 206. In a preferred embodiment, as one surface structure is displaced in one direction, the other surface structure is displaced in the opposite direction. Thus, forces from a field of flow which depress one surface structure will elevate the other surface structure, resulting in a greater depressing force on the latter surface structure. This same relationship can also be accomplished with surface structures 212 in two generator cells 200 that are adjacent to one another by having a connecting joint 211 which pivots between the two surface structures about a pivot point or axis 210, as shown in FIG. 1i. As joint 211 rotates about point 210, the paired surface structures 212 will alternately be elevated or depressed. Joint 211 can be joined to structures 212 via a rotational coupling, sliding contact, or an elastic or flexible connection. In another embodiment, the remaining covering over the cells 200 can also be elastic to maintain contact as desired between joint 211 and structures 212.

Figure 2A:
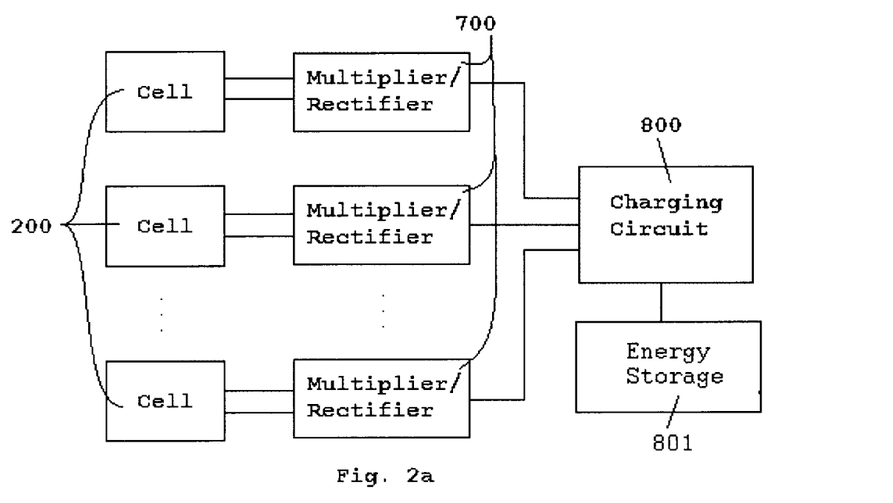
FIG. 2a depicts a block diagram of various components for implementing an embodiment of the present invention where the cells are connected to individual multiplier/rectifier circuits.
Figure 2B:
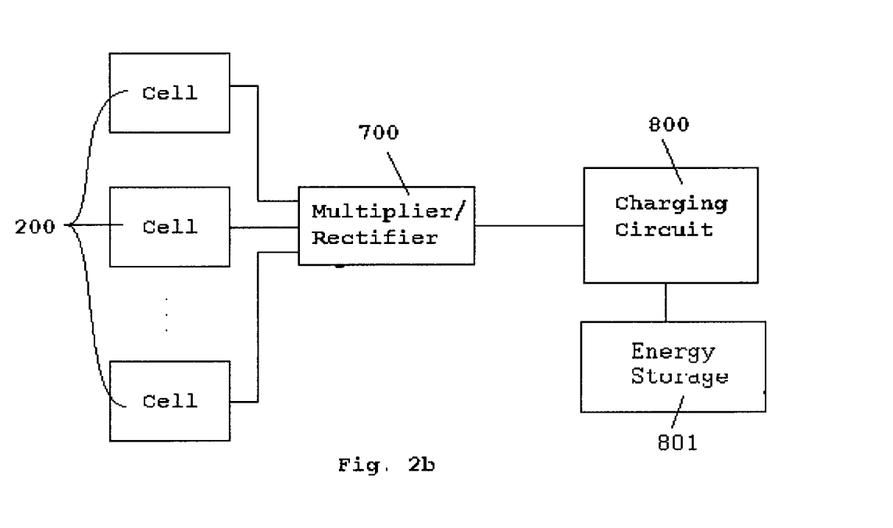
FIG. 2b depicts a block diagram of various components for implementing an embodiment of the present invention where the cells are connected to a single multiplier/rectifier circuit.

Referring to FIGS. 2a and 2b, various embodiments are provided for connecting one or more cells 200 to one or more multiplier/rectifier circuits 700. The multiplier/rectifier circuit 700 can be connected to one or more cells 200. The cells 200 may also be connected in series or in parallel or both, depending on the desired type and magnitude of output. In a preferred embodiment of the invention, a grouping of cells is connected in series and groups of cells are then connected in parallel in order to increase the output voltage and maintain a minimum level of power output.

Various voltage multiplication or rectification circuits known in the industry can be implemented as the voltage multiplier/rectifier blocks 700 in FIGS. 2a and 2b. These types of circuitry can convert AC to DC and/or shift the output to reduce negative voltages. Some known circuit designs include Greinacher voltage multiplier circuitry, Villard voltage multiplier circuitry, Cockcroft-Walton voltage multiplier circuitry, and full-wave rectifier circuitry. While these are circuit designs provided in the present embodiments, any other type of voltage multiplier or voltage rectifier can be used to accomplish the same purpose of rectification or voltage shifting. The particular design selected will vary depending on the cost restrictions and the requirements of the application. For example, some applications may be designed to provide rectified outputs that have a small ripple. Other applications may tolerate significant variability in the output or even a sinusoidal AC type output.

For the multiplier/rectifier circuits 700 used, various types of diodes may also be selected for the circuitry, depending on cost and performance requirements. Certain diodes may provide larger reverse bias voltages or relatively reduce the voltage consumption of circuitry. In a preferred embodiment of the invention, Schottky diodes are utilized in the multiplier/rectifier circuit 700 in order to minimize the required forward voltage bias of the diode relative to other design options.

The outputs from the multiplier/rectifier circuits 700 can be directed to charging circuitry of various designs known within the art. Some examples of known charging circuits include constant voltage, constant current, taper current, pulsed charge, burp charge, IUI charge, float charge, or trickle charge circuitry. These various designs are known within the art and the particular selection depends on the needs of the system being designed, as well as cost and the amount of electricity generated. Some designs may also be constrained by the type of storage device for the system. For example, the storage device can be a lithium-ion, lead acid, NiMH, or nickel-cadmium battery, each of which may preferably be incorporated with particular charging circuits. Also, the storage device could be a supercapacitor, which is known within the art as an alternative to batteries. Alternatively, the outputs can be directly fed into electronic circuitry utilizing the generated power. In one preferred embodiment of the invention, the output is connected to lithium-ion batteries or supercapacitors already used in vehicles as a power source. In another embodiment of the present invention, the multiplier/amplifier circuit may be incorporated into the charging circuit.

Figure 4:
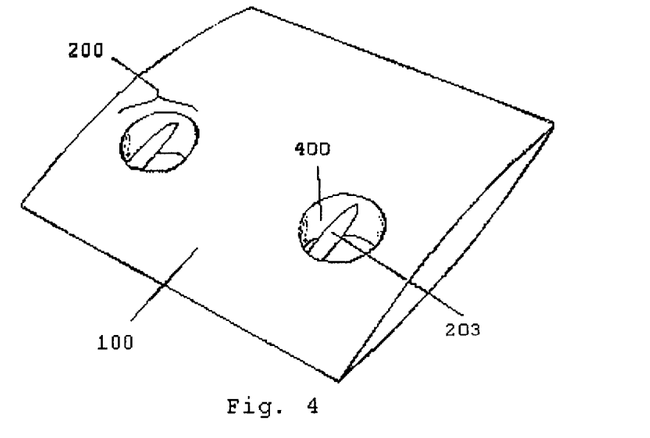
FIG. 4 depicts an example of a wing structure for implementing an embodiment of the present invention where the structure contains cavities and a thin, rigid plate extending partially over the opening to each cavity.

FIG. 4 depicts an embodiment of the present invention in an aerofoil shape. The cell cavities 400 may be formed as cylinders although any shape can be utilized. The particular selection can be designed according to the anticipated pressure differential across the covering of the cell 200. For example, to achieve a certain neutral air pressure within the cell 200, the volume of the cavity 400 must be taken into account along with the elasticity or rigidity of the covering. At atmospheric pressure, this will be less important. But for a pressure biased cell, whether negative or positive relative to atmospheric pressure, the cell contents will exert a force on the covering, displacing it by an amount relative to the elasticity forces. The covering will achieve an equilibrium state where the pressure force within the cavity 400 is balanced by the force from the covering resisting further deformation. The cell can also be filled with a gas or liquid having a different density than air. This will change the compressibility of the contents of the cell, changing the amount of deflection of the cover and the forces needed to move the covering.

In another embodiment, the covering can also be designed so that a rigid plate 203 as shown in FIG. 4 is incorporated into the covering. The rigid plate can be formed in connection with the substrate so as to be elastically movable. In a preferred embodiment, the rigid plate 203 can be formed so that the neutral position is at an angle relative to the surface substrate 100 such that the rigid plate 203 protrudes away from the cell cavity 400.

Figure 6:
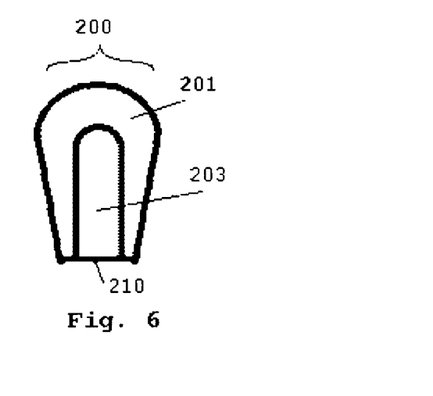
FIG. 6 depicts an example of a design for a tear shaped covering as part of an embodiment of the present invention.

In another embodiment, depicted in FIG. 6 the cell opening in the substrate over which the covering 201 can be shaped so as to provide about the same elastic forces across the dimensions of the rigid plate 203. A preferred embodiment has a tear shaped opening such that the rigid plate's 203 pivot axis 210 is fixed at or near the narrow point of the tear shape. The point of greatest deflection for the rigid plate is fixed around the radial point for the generally spherically curved portion of the tear shape. This allows the covering 201 to stretch proportionally to the deflection amount along the rigid plate 203.

Figure 5:
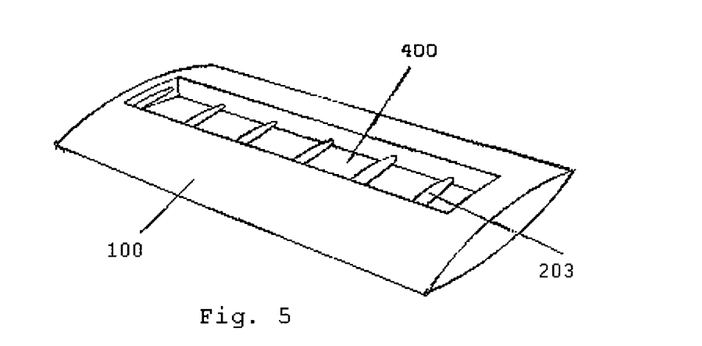
FIG. 5 depicts an example of a wing structure for implementing an embodiment of the present invention where the structure contains a large, shared cavity and thin, rigid plates extending partially over the opening or openings to the cavity.

In another embodiment, the cell cavity in the substrate can be a larger structure as shown in FIG. 5. Larger structures allow for multiple rigid plates 203 to be associated with the same cavity 400 and thus the same cell pressure. In another embodiment, this larger structure can preferably incorporate a rigid covering over the entire opening which in turn has smaller openings shaped for individual rigid plates and coverings, similar to FIG. 6. This allows the design to simultaneously control the covering displacements with the elasticity of the covering and maintain approximately the same pressure applied to all of the individual coverings.

FIG. 1g depicts the cross-section of the types of structures depicted in FIGS. 4 and 5 with a covering, as described above. The curved front area 102 of the substrate 100 is followed by the cell 200, which comprises a covering 202 with preferably a piezoelectric material 204 incorporated into parts of the covering 205 so as to straddle the edges of cavity 400. Alternatively, embodiments containing magnets and coils can also be employed, as described above. In FIGS. 4 and 5, the cavity 400 is depicted some distance from the leading edge of the structure. However, it is understood that the cavity 400 can be positioned anywhere along the structure 100. For example, the cavity can be formed at the leading edge itself such that the covering is adjacent to or overlapping the leading edge of the structure. Such a design may be preferred in certain circumstances where the movement of the surrounding medium creates the greatest forces at the leading edge.

In another embodiment, multiple layers of substrates can be oriented so as to funnel wind into smaller pathways which are adjacent to the openings to the cavities in the substrates. This can be visualized by stacking the embodiments depicted in FIGS. 1g, 4 and 5 to create a tiered structure with gaps between each tier. The gaps form the smaller pathways, funneling fluid flow along a path adjacent to the cover 202 of FIG. 1g. Alternatively, only one additional layer need be added to the embodiments depicted in FIGS. 1a-d, creating a single smaller pathway adjacent to the cover 202. For example, a spoiler on a vehicle located over the top of an array of generator cells will serve to shrink the fluid flow pathway adjacent to the covers 202 of the generator cells.

Figure 3A:
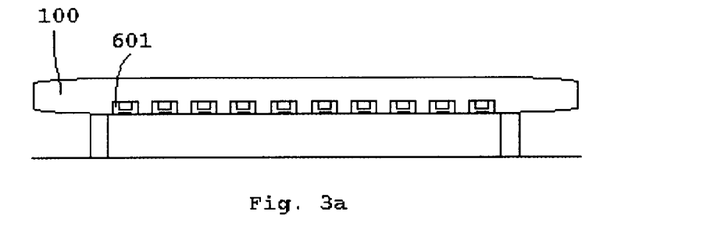
FIG. 3a depicts an example of an array of cells for implementing an embodiment of the present invention where the array is located along a bottom surface of a structure.
Figure 3B:
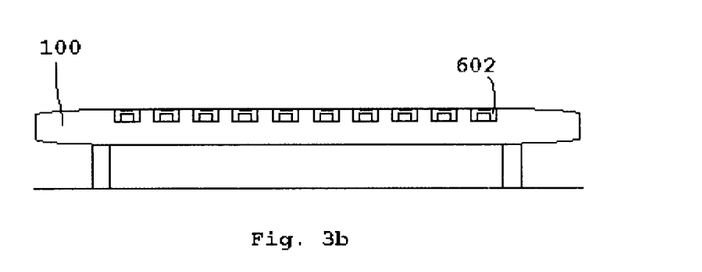
FIG. 3b depicts an example of an array of cells for implementing an embodiment of the present invention where the array is located along a top surface of a structure.
Figure 3C:
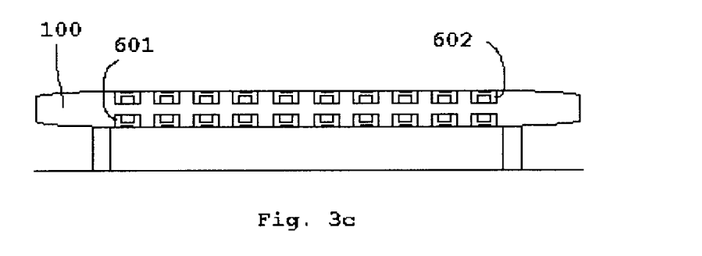
FIG. 3c depicts an example of an array of cells for implementing an embodiment of the present invention where the array is located along both the top and bottom surfaces of a structure.

Similarly, as depicted in FIGS. 3a-c, the substrate 100 comprises an aerofoil or wing structure such as a spoiler on a vehicle. The cells can be mounted on the top 602 or the bottom 601 surfaces or both. Alternatively, the structure 100 can also be hollowed out for a single cavity or comprise a plurality of larger cavities that contain multiple generator cells. These various designs are depicted in FIGS. 3-5. In a further embodiment, the substrate is incorporated into the body of the moving object. For example the substrate can be a panel on the body of a vehicle, such as the hood, truck, roof, or door panels. In another embodiment, the substrate can be incorporated into paneling underneath the vehicle. Additionally, the substrate can be incorporated into wall or roof panels of cargo trucks. This same paneling can also be incorporated into the sides or the roof of trains or rail transportation. The designs would be similar to those employed in vehicles and cargo trucks. The openings to the cavities in the substrate can also be coupled with a control mechanism that either clamps the elastic covering and/or rigid plate or slides over the covering. This allows the generator to be shut down during certain operating circumstances. For example, if the energy storage system is completely charged, the generator can be shut down instead of rerouting the energy. Alternatively, if the movement speed of the medium is outside an ideal range, the generator can be shut down until a better environment exists.

In a preferred embodiment, the paneling is incorporated into the trunk of the vehicle such that the trunk itself serves also as the cavity for the embodiment. The cells are aligned along the back edge of the trunk. The covering over each of the cells comprises a rigid plate and an elastic membrane such that the rigid plate is elastically oriented in the neutral state up at an angle relative to the trunk surface to form a small spoiler shape. Magnets are attached to the rigid plates. A coil for each magnet is positioned underneath the rigid plate at a particular separation to allow for the anticipated downward deflection of the rigid plate. The coils are sized approximately equal to the cross-sectional area of the magnet. Alternatively, piezoelectric material or another electrogenerative film as previously described and known within the state of the art can be incorporated into the covering in lieu of or in addition to the magnet and coil design.

The substrate could also be a panel on a boat. The paneling could be fixed to the top surface or upper siding of the boat to make use of the movement of air as the boat moves. Alternatively, the panel can be incorporated into the base of the boat which is underwater to make use of the relative movement of water.

Figure 7A:
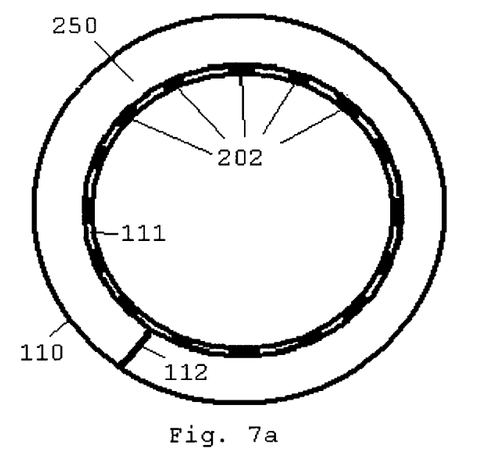
FIG. 7a depicts an example of a pipe structure for implementing an embodiment of the present invention with fluid flow in pipes where the pipe structure shares a cavity across each opening.
Figure 7B:
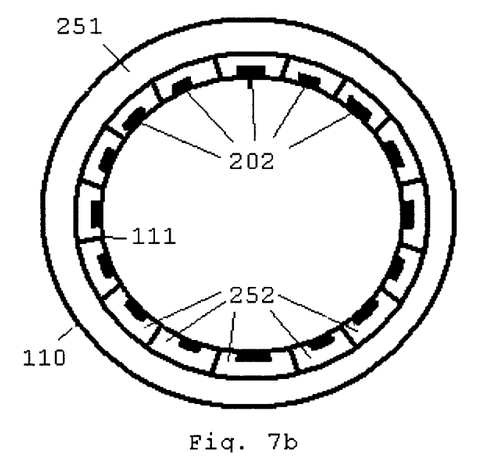
FIG. 7b depicts an example of a pipe structure for implementing an embodiment of the present invention with fluid flow in pipes where the pipe structure has a separate cavity for each opening.

In another preferred embodiment of the present invention, the substrate can be incorporated with a dam, waterbed, or pipe so as to harness the flow of water or some other liquid as the medium. For example, as depicted in FIG. 7a, a hollowed ring structure can be formed for the substrate having a central cavity 250, an inner wall 111, and an outer wall 110. Optionally, the ring structure may have an internally supporting beam 112, although if the ring structure's depth is not too great, such a support structure would not be necessary because the structure would be supported from caps that would radially connect inner wall 111 to outer wall 110. Each covered opening 202 in the ring structure shares the same cavity 250. Alternatively, as shown in FIG. 7b, multiple separate cavities 252 can be formed within the ring structure between inner wall 111 and outer wall 110. The area between outer wall 110 and cavity 252 can either be hollow as well or filled in. If cavity 252 is filled in, then functionally, it would be as if outer wall 110 was adjacent to cavity 252. Each covered opening 202 has its own cavity 252. Various other combinations could also be easily implemented, for example, where pairs of covered openings could share the same cavity and multiple cavities would be incorporated into the ring structure. The ring structure can be incorporated into a piping system such that the inner surface of the ring structure 111 shares surfaces with the inner wall of the pipes. The connections can either be welded, glued, or screwed together. The inner ring surface has openings formed to the cavity or cavities and the openings are covered according to the various embodiments of the present invention previously described. In a preferred embodiment, the coverings are designed so that rigid plates in each of the coverings 202 are angled in the neutral state to protrude towards the central axis of the ring structure and into the fluid flow. The rigid plates are oriented so that the pivot axis or point for the rigid plates is the first part to be in contact with any fluid flow, thus accommodating rather than opposing the expected flow of fluid through the pipes.

In another embodiment of the present invention, the substrate can be incorporated into the surface structure of a plane. In a preferred embodiment, the substrate is shaped as a ring along the outside of the body of a passenger plane. The ring has separate cavities equally and symmetrically positioned along the circumference. The coverings maintain a generally flat surface with the rest of the plane's body so as to minimize additional structures on the surface of the plane. The functionality of such an embodiment would be similar to the embodiments previously described above, especially the vehicular embodiments. In another embodiment similar to being incorporated into a plane, the substrate can be incorporated into an airborne generator design that is tethered to a cable. The airborne generator comprises a gliding or flying structure with generator cells incorporated into the surface. The airborne generator is then flown at high altitude to take advantage of greater and more consistent wind speeds. Because embodiments of the present invention minimize aerodynamic impact from the generator itself, the airborne generator would be able to better maintain altitude and would require less complex control systems to stay in flight.

Figure 8:
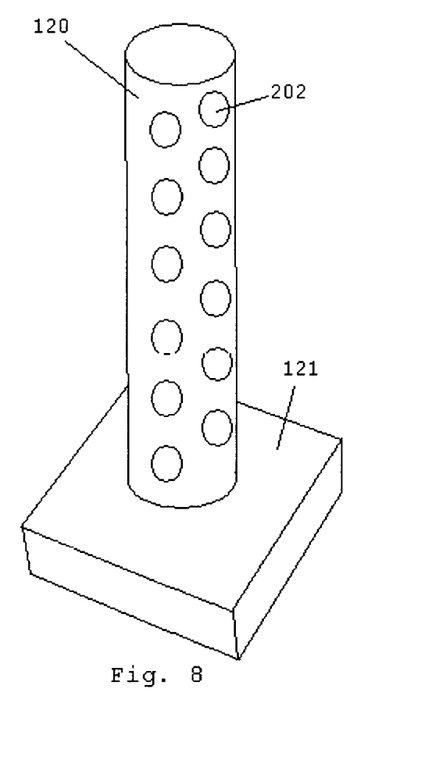
FIG. 8 depicts an example of a tube structure with cells distributed along the surface of the tube where the tube may be internally pressurized if desired.

FIG. 8 depicts another embodiment of the present invention where the substrate comprises a long tube 120 which is sealed to provide a pressurized internal cavity. The tube structure 120 has openings, which are optionally but preferably symmetrically oriented along the length of the tube 120, with coverings 202 that maintain the integrity of the internal cavity and provide a flexible surface structure so as to incorporate an electrogenerative device. The covered openings preferably create a dimpled arrangement along the circular tube 120.

Figure 9A:
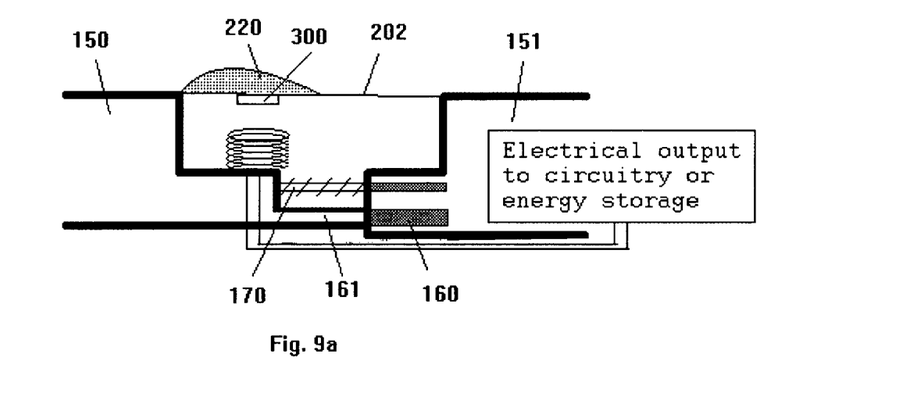
FIG. 9a depicts a tunable fluid flow generator with a protruding contacting portion and multiple frame portions that can be laterally moved along a guide rod.
Figure 9B:
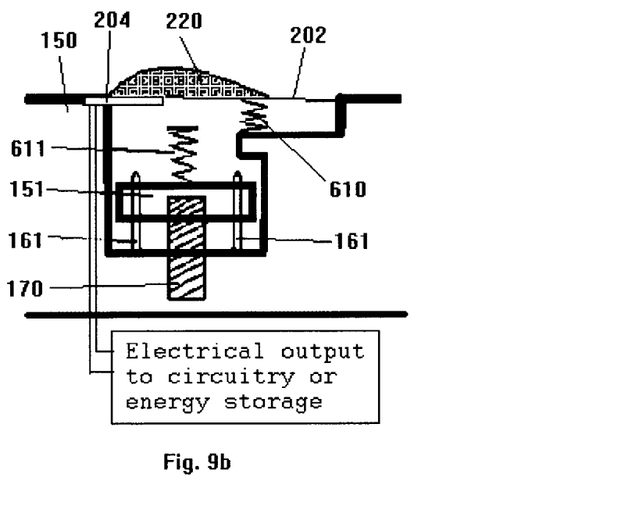
FIG. 9b depicts a tunable fluid flow generator with a protruding contacting portion, multiple elastic members and multiple frame portions that can be vertically moved along a pair of guide rods to bring elastic members into and out of contact with the protruding contacting portion.

In another embodiment of the present invention as depicted in the embodiments shown in FIGS. 9a and 9b, the frame comprises a control member connected between two or more portions of the frame which can be positioned relative to one another. In FIG. the embodiment shown in 9a, preferably one of the portions of the frame is considered a fixed portion 150, and one or more of the remaining portions is treated as adjustable 151. One of the adjustable portions of the frame 151 is also connected to the elastic member 202, which is connected to the contacting portion 220. Preferably, the adjustable portion 151 of the frame is mounted on a rail, rod, tongue, or other mechanical guide system 161 so as to only have one degree of movement.

DETAILED DESCRIPTION OF THE PREFERRED EMBODIMENTS

Additionally, any male-female mechanical system can be used where the male portion of the mechanical system (e.g., 161) includes a protrusion of a certain shape or cross-section, and the female portion of the mechanical system (e.g., 160) includes a corresponding negative space that accepts the protrusion shape or cross-section. The female portion 160 also provides a depth to allow a range of movement, and can either by physically limited by the boundaries of the depth or by other blocking components that engage with the male portion 161 at the intended boundaries of movement. Alternatively, as shown in the embodiment shown in FIG. 9d, the mechanical guide system 155 can include a hinge, a ball-socket joint, or another mechanical joint design which provides a rotational degree of freedom for the adjustable frame member 153 relative to the fixed frame member 152 about an axis of rotation. For example, a living joint is known in the field of plastics where a single piece of plastic can be made rotationally bendable about an axis of rotation in the middle of the piece of plastic by pinching it with two hot metal elements to form a hinge joint. Additionally, the use of ball bearings or lubrication in the joint assembly can help facilitate reduced friction due to mechanical movement and load-support.

A control member can adjust the tension of the elastic member 202 by adjusting the distance between two portions of the frame, either in a translational direction, a rotational direction, or a combination of the two. The modified distance can stretch or compress the elastic member, changing its tension. For example, in the embodiment shown in FIG. 9a, a servo can drive the screw gear 170 to slide adjustable frame portion 151 relative to fixed frame portion 150 along the guide rail 161. Alternatively, in the embodiment shown in FIG. 9b, the control member could bring additional elastic members 611 into engagement with the contacting portion 220 by driving the screw gear 170 out of the frame and sliding adjustable frame portion 153 along the guide rods 161 towards the contacting portion 220. For example, if the additional elastic members 611 include springs, the control member can reposition the springs so that the free end is brought into engagement with the contacting member 220. This changes the number of elastic members engaged to the contacting portion alongside the fixed elastic member 610 connected to the fixed frame portion 150, altering the overall elasticity of the coupled system components.

Figure 9C:
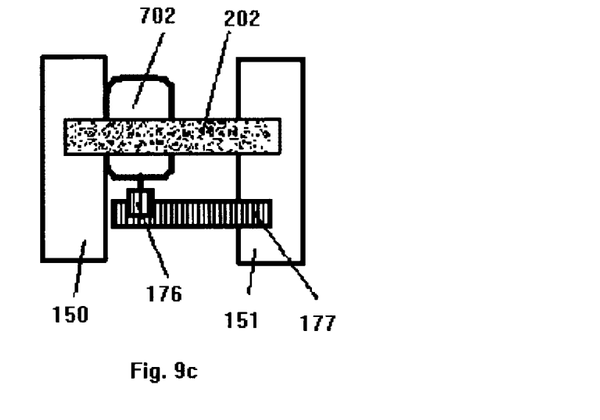
FIG. 9c depicts a motor and gear assembly for moving two frame portions using a rack and pinion.

In the embodiment shown in FIG. 9c, a servo 702 in the control member controls the positioning of an adjustable frame member 151 relative to a second frame member 150. The servo 175 is preferably coupled to one of the frame members that is fixed in position and drives a gear 176 in a gear assembly. The adjustable frame member 151 is coupled to a second gear 177 in the gear assembly so that the driving force of the servo motor 702 repositions the adjustable frame member 151 relative to another frame member 150. For example, the first and second frame members can be mechanically connected via a rack and pinion system or a screw gear. The second frame member therefore has a single degree of freedom in a linear direction. As the adjustable frame member is moved closer to the second frame member, the tension in the elastic member 202 connected between both frame portions is reduced. As the adjustable frame member is moved away from the second frame member, the tension in the elastic member is increased.

Figure 10:
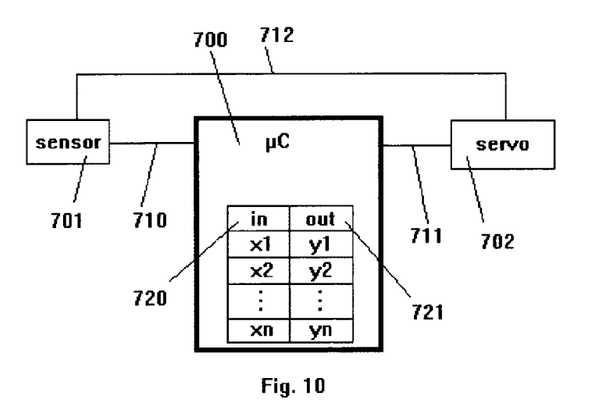
FIG. 10 depicts a fluid flow generator control circuit with a sensor, a servo, and a microcontroller having a stored lookup table of output values corresponding to the sensor input values for controlling the operation of the servo.

Preferably as shown in the embodiment in FIG. 10, the servo 702 is controlled by a computer controller, such as a microcontroller, 700 and the positioning or activation of the servo 702 is dependent on one or more control inputs 710 into the computer controller. In FIG. 10, the control inputs can be from any number of system or environment variables, preferably measured from a sensor 701. For example, the velocity of the frame relative to the surrounding medium can be measured and used as an input control variable. In addition to the velocity of the system, other variables such as engine gear state, acceleration, temperature, altitude, pressure, or amplitude and/or frequency of oscillation (such as of the contacting member) can be used as an input on signal line 710 to the computer controller. The control input on signal line 710 can be polled, or alternatively, the input can be provided only on a change in value of the control input, which would preferably trigger an interrupt. Preferably, the change in value must surpass a minimum threshold value in order to trigger the interrupt. The computer controller 700 uses the control input value 710 to check against a lookup table which contains the servo controller output 721 that should correspond to a given input value 720.

The lookup table output values 721 are then output on the signal line 711 to control the servo 702 so that the appropriate tension or elasticity of the system's elastic member is obtained. Depending on the needs and desired complexity of the system, the lookup table can any number of values or output states. The more granular the table, the more energy will be expended transitioning the servo controller. However, the system elasticity or tension can generally be more finely tuned with more lookup table values. Preferably, the system also employs hysteresis transitioning so as to avoid rapid oscillations between two states, such that a different input value is needed to move into a state as opposed to moving out of the state.

Figure 11A:
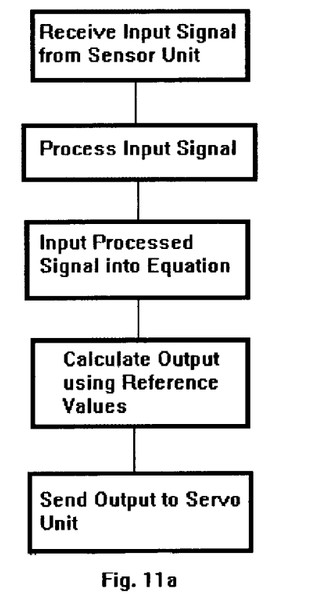
FIG. 11a depicts a microcontroller algorithm for controlling a servo in a tunable fluid flow generator using an input signal and stored equations relating input signals to output signals.
Figure 11B:
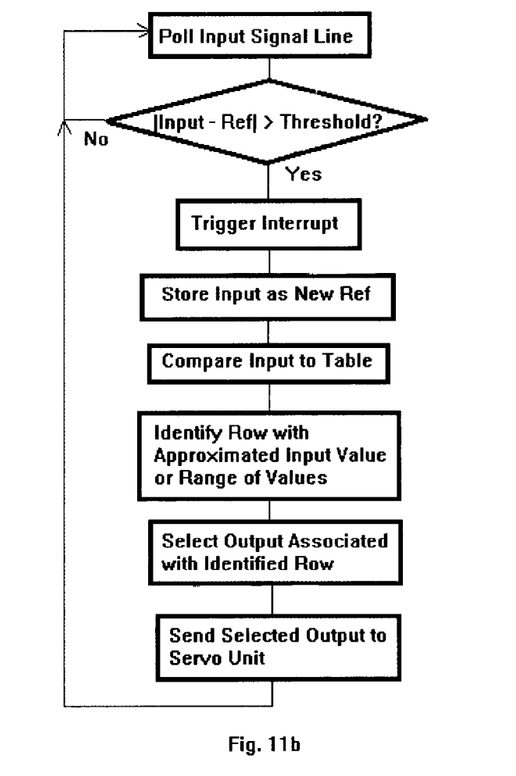
FIG. 11b depicts a microcontroller algorithm for controlling a servo in a tunable fluid flow generator using a stored lookup table.

In conjunction with FIG. 10, an embodiment of a process deployed by the computer controller is shown in FIG. 11*b*. In the standard operational program of microcontroller 700, sensor 701 is polled along signal line 710 for a change in its value relative to a prior reference value. When the value has changed with a relative magnitude that exceeds a programmed threshold, microcontroller 700 is interrupted to execute a service routine. The service routine resets the reference value to the triggering sensor value. Then the service routine compares the triggering sensor value to programmed input ranges in a stored lookup table in order to determine a closest match. The service routine then selects the output associated with the determined input range in the stored lookup table and transmits the selected output to the servo 702. The service routine then ends, and microcontroller 700 returns to its standard operational program with a new reference value for polling and comparison of sensor 701.

Alternatively as shown in the embodiment in FIG. 11*a*, the control input can be fed into an equation or program on the computer controller which calculates the desired controller output. The granularity of this system's behavior would be more dependent on the sampling rate for the control input value since an equation can provide a smoother behavior curve. In another alternative, as shown in FIG. 10, the servo controller output can be connected to the servo controller in a feedback loop 712 where the previous controller output value adjusts the behavior of the servo controller in conjunction with the current control input value.

Figure 9D:
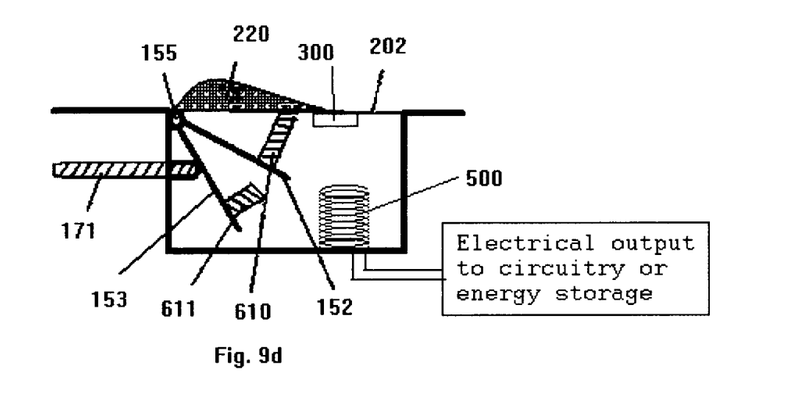
FIG. 9d depicts a tunable fluid flow generator with a protruding contacting portion, multiple elastic members and rotatable frame members for bringing elastic members into and out of contact with the protruding contacting portion.

In FIG. 9*d*, an alternative frame is shown in which each adjustable frame portion 153 can rotate towards or away from the contacting portion 220 relative to the remaining frame portions 152. Alternatively, the movement of each frame portion can be linear in a direction generally orthogonal to the fluid flow direction. Each frame portion has an elastic member, 610 and 611, connected to it, and the movement of the adjustable frame portions engages or disengages the connected elastic members 611 from the contacting portion 220. For example, when all of the adjustable frame portions are in a disengaged position, only the elastic member 610 connected to the fixed portion 152 of the frame is in contact with the contacting portion 220. Additional springs 611 can be engaged with the contacting portion 220 by moving one or more of the adjustable frame portions 153 closer to the contacting portion, causing the distal end of the spring 611 connected to the adjustable frame portion to enter into the movement path of the contacting portion during operation. Preferably, the positioning of the adjustable portions are controlled by servo controllers as described above, and each spring has a different elasticity. As additional springs are brought into contact with the contacting portion, the elastic characteristics of the system are altered.

A braking system can also be used in conjunction with the previously described embodiments. The braking system halts or substantially limits the movement of the contacting member, for example by engaging an inelastic blocking frame element with the contacting member, thus preventing the contacting member from moving relative to the frame. Alternatively, the braking system can increase the damping on the contacting member by engaging a significantly stiffer elastic component such as a spring or by applying a frictional force along the rotational axis for the contacting member.

The embodiments described above are intended to provide illustrations of particular aspects of the present invention. It is evident to persons of ordinary skill in the art that various modifications and changes may be made thereto without departing from the broader understanding and scope of the present invention disclosed herein. The particular embodiments and figures are provided to illustrate aspects of the present invention and are not the only embodiments contemplated by that broader disclosure of the present invention herein.

What is claimed is:

1. A tunable fluid flow generator for generating energy from a flow of a surrounding fluid, the generator comprising:
   a frame moveable through said fluid, said frame comprising:
      a plurality of frame portions comprising at least a first, adjustable frame portion and a second frame portion, wherein said adjustable frame portion is moveable relative to said second frame portion;
      a cavity formed between said first and said second frame portions, said cavity having an opening on a surface of said frame connecting to said cavity; and
      a mechanical guide joining said plurality of frame portions;
   a contacting member comprising a first end and a second end, the contacting member
      positioned to cover said opening to at least partially enclose said cavity and to contact a fluid flow over said surface of said frame,
      wherein the contacting member is connected to said frame at said first end of said contacting member, and said contacting member is moveable relative to said frame due to said fluid flow;
   an elastic member coupled to said adjustable frame portion and coupled to said contacting member at said second end, wherein movement of said adjustable frame portion alters a tension in said elastic member for tuning a response of said fluid flow generator to said fluid flow;
   an electrogenerative portion mechanically coupled between said contacting member and said frame for generating electricity from movement of said contacting member relative to said frame; and
   an electrical output line electrically coupled between said electrogenerative portion and an electrical load.

2. The fluid flow generator of claim 1 wherein
   said electrogenerative portion includes at least one of a piezoelectric element, and a magnetic element;
   said elastic member includes at least one of a spring, and an elastic band, and a cantilever; and
   said electrical load includes at least one of a battery, a capacitor, a supercapacitor, an ultracapacitor, an electric motor, and an electronic circuit.

3. The fluid flow generator of claim 1 further comprising:
   a control member for moving said adjustable frame portion relative to said second frame portion.

4. The fluid flow generator of claim 1 wherein said mechanical guide includes at least one of a guide rod and hole, a guiding rail and slot, a protrusion with a correspondingly shaped recess, and a male-female mechanical connection.

\* \* \* \* \*